United States Patent
Hadley et al.

(10) Patent No.: US 8,356,840 B2
(45) Date of Patent: Jan. 22, 2013

(54) MARKING DEVICE FOR A PERSONAL MOBILITY VEHICLE

(75) Inventors: Robert Hadley, Yorba Linda, CA (US); Steve Sramek, Long Beach, CA (US); Bradley James Williams, Long Beach, CA (US)

(73) Assignee: Razor USA, LLC, Cerritos, CA (US)

( * ) Notice: Subject to any disclaimer, the term of this patent is extended or adjusted under 35 U.S.C. 154(b) by 127 days.

(21) Appl. No.: 12/818,045

(22) Filed: Jun. 17, 2010

(65) Prior Publication Data

US 2011/0121551 A1      May 26, 2011

Related U.S. Application Data

(60) Provisional application No. 61/268,947, filed on Jun. 18, 2009.

(51) Int. Cl.
*A63C 17/26* (2006.01)
(52) U.S. Cl. ............................ 280/816; 280/87.041
(58) Field of Classification Search .................. 280/816, 280/762, 11.207, 11.208, 11.209, 87.041, 280/87.042
See application file for complete search history.

(56) References Cited

U.S. PATENT DOCUMENTS

| | | | |
|---|---|---|---|
| 2,205,713 A | 6/1940 | Cain | |
| 2,389,198 A | 11/1945 | Kent | |
| 3,086,788 A | 4/1963 | Vislocky | |
| 4,045,046 A | 8/1977 | Taylor et al. | |
| 4,286,806 A | 9/1981 | Bergstein | |
| 4,394,037 A | 7/1983 | Kuntz | |
| 4,466,630 A | 8/1984 | Larkin | |
| 4,834,407 A | 5/1989 | Salvo | |
| 5,048,897 A * | 9/1991 | Yeh | 280/87.042 |
| 5,323,869 A | 6/1994 | Kurayoshi et al. | |
| 5,391,102 A | 2/1995 | Bosch | |
| 5,460,390 A * | 10/1995 | Miller | 280/11.208 |
| 5,523,925 A | 6/1996 | Bare, IV | |
| 5,895,072 A | 4/1999 | Coroneos et al. | |
| 5,921,653 A | 7/1999 | Chien | |
| 6,059,315 A | 5/2000 | Selph | |

(Continued)

FOREIGN PATENT DOCUMENTS

| | | |
|---|---|---|
| CA | 2 433 064 A1 | 10/2004 |
| CN | 201 338 697 Y | 11/2009 |

(Continued)

OTHER PUBLICATIONS

European Search Report for Application No. 09-170614.3 mailed Sep. 21, 2010 in 7 pages.

(Continued)

*Primary Examiner* — Hau Phan
(74) *Attorney, Agent, or Firm* — Knobbe Martens Olson & Bear, LLP

(57) ABSTRACT

A marking device that is supported by a personal mobility vehicle, such as a scooter, is movable from a first position, in which the marking device does not contact the riding surface, and a second position, in which the marking device contacts the riding surface. The marking device includes an attachment portion and a marking portion that creates markings on the riding surface as a result of frictional contact with the riding surface. The marking device can also include an actuation portion which is accessible to the user and allows the user to move the marking device to the second position. In one arrangement, the marking device includes an elastic marking member which is configured to bend in order to maintain contact with the riding surface.

22 Claims, 9 Drawing Sheets

U.S. PATENT DOCUMENTS

| | | | |
|---|---|---|---|
| 6,821,181 B1 | 11/2004 | Domingues | |
| 6,961,531 B2 | 11/2005 | Hoobing | |
| 7,007,977 B1 | 3/2006 | Gallagher | |
| D606,610 S | 12/2009 | Sramek et al. | |
| 7,862,055 B2* | 1/2011 | Bennett | 280/87.041 |
| 8,146,947 B2* | 4/2012 | Hadley | 280/816 |
| 2003/0151214 A1* | 8/2003 | Chen | 280/11.209 |
| 2004/0000768 A1 | 1/2004 | Miller | |
| 2004/0021283 A1* | 2/2004 | Serling | 280/87.042 |
| 2004/0076453 A1 | 4/2004 | Hoobing | |
| 2005/0127630 A1* | 6/2005 | Kuhlman et al. | 280/87.042 |
| 2010/0096824 A1 | 4/2010 | Hadley | |
| 2010/0171280 A1 | 7/2010 | Hadley | |

FOREIGN PATENT DOCUMENTS

| | | |
|---|---|---|
| DE | 202 06 300 | 9/2002 |
| DE | 101 47 258 A1 | 4/2003 |
| DE | 10 2005 003027 B3 | 2/2006 |
| EP | 1867368 A2 | 12/2007 |
| EP | 2 179 913 | 4/2010 |
| FR | 2 753 634 A1 | 3/1998 |
| GB | 2 363 175 A | 12/2001 |
| WO | WO 02/44007 A1 | 6/2002 |

OTHER PUBLICATIONS

International Search Report and Written Opinion for Application No. PCT/US2010/039086 mailed Jun. 17, 2010 in 16 pages.

* cited by examiner

MARKING DEVICE FOR A PERSONAL MOBILITY VEHICLE

PRIORITY INFORMATION

The present application claims benefit under 35 U.S.C. §119(e) to U.S. Provisional Patent Application No. 61/268, 947, filed Jun. 18, 2009, entitled "CHALK HOLDER FOR SCOOTER," the entire contents of which is hereby expressly incorporated by reference.

BACKGROUND OF THE DISCLOSURE

1. Field of the Invention

Embodiments of the invention relate generally to personal mobility vehicles and, more specifically, to a scooter with a marking device.

2. Description of the Related Art

The use of personal mobility vehicles, such as scooters, has become a popular recreational activity. Scooters have become popular among many age groups and there are many different scooter variations and scooter designs. Conventional scooters generally have at least two wheels and some type of steering mechanism. Other scooter designs include three or more wheels. Scooter designs have also become more compact and convenient. With the increase in scooter popularity, there has also been a significant increase in the demand for scooter accessories.

The generation of markings is one feature that has been added to a personal mobility vehicle in at least one instance. U.S. Pat. No. 5,895,702 to Coroneos discloses an inline skate that includes a chalk-holding mechanism at the rear of the skate. The chalk-holding mechanism is biased toward a marking position, in which a piece of chalk is held in contact with the ground surface when the skate is used by a skater. However, with such an arrangement, if it desired to use the skates without making marks, the chalk-holding mechanism must be removed from the skate.

SUMMARY OF THE DISCLOSURE

Preferred embodiments of the scooter, or other personal mobility vehicle, and marking device are configured to allow a user to generate markings as desired while using the vehicle. A user can produce markings while maintaining control of the vehicle. Furthermore, certain of the preferred embodiments allow the user to conveniently activate a marking device as desired with his or her foot without releasing his or her hands. Certain preferred embodiments are configured so that the marking device is located proximate to the feet of the user so that the user is not required to move his or her foot a large distance in order to activate the marking device.

A preferred embodiment is a marking device for a personal mobility vehicle, such as a scooter, the vehicle having a support member and at least one wheel. The marking device has a body, which includes an attachment portion configured to be supported by a vehicle. The body also includes an actuator portion that is accessible to the foot of a user. The marking device also includes a marking assembly supported by the body that generates markings when in contact with a riding surface. The marking device has an engaged position in which the marking assembly is in contact with the riding surface. The marking device also has a locking mechanism configured to hold the marking device in the engaged position. The marking device is movable to the engaged position in response to the user acting upon the actuator portion and the marking device is releasable from the engaged position in response to the user acting upon the marking device.

Another preferred embodiment is a marking device for a personal mobility vehicle, such as a scooter. The vehicle has a body and at least one wheel. The marking device includes an attachment portion configured to be supported by a personal mobility vehicle. The marking device also includes a marking assembly that generates markings when in frictional contact with a riding surface. The marking device has a first position in which the marking assembly does not contact the riding surface and a second position in which the marking assembly contacts the riding surface. The marking device can be fixed in the first position and also can be fixed in the second position. In some arrangements, the marking device can be moved from the first position to the second position by acting upon an actuation member.

In another embodiment, a personal mobility vehicle, such as a scooter, includes a body configured to support a user and at least one wheel supported by the body and rotatable around an axis. The vehicle also includes a marking mechanism supported by the body. The marking mechanism includes an attachment member configured to be supported by the body. The marking mechanism also includes an elastic member with a first portion and a second portion. The first portion is supported by the attachment member. The marking mechanism includes a marking material configured to generate markings when in frictional contact with a riding surface. The second portion of the elastic member is configured to support the marking material and bias the marking material towards a position in which the marking material contacts the riding surface. The elastic member is configured to bend in order to assist in maintaining contact between the marking material and the riding surface.

BRIEF DESCRIPTION OF THE DRAWINGS

These and other features, aspects, and advantages of the present invention are described below with reference to drawings of preferred embodiments, which are intended to illustrate, but not to limit, the present invention. The drawings contain 8 figures.

DETAILED DESCRIPTION OF PREFERRED EMBODIMENTS

In the following detailed description, terms of orientation such as "top," "bottom," "upward," "downward," "lower," "front," "frontward," "rear," "rearward," and "end" are used to simplify the description of the context of the illustrated embodiments. Likewise, terms of sequence, such as "first"

and "second," are used to simplify the description of the illustrated embodiments. However, other orientations and sequences are possible, and the present invention should not be limited to the illustrated orientation(s). Those skilled in the art will appreciate that other orientations of the various components are possible.

Figure 1:
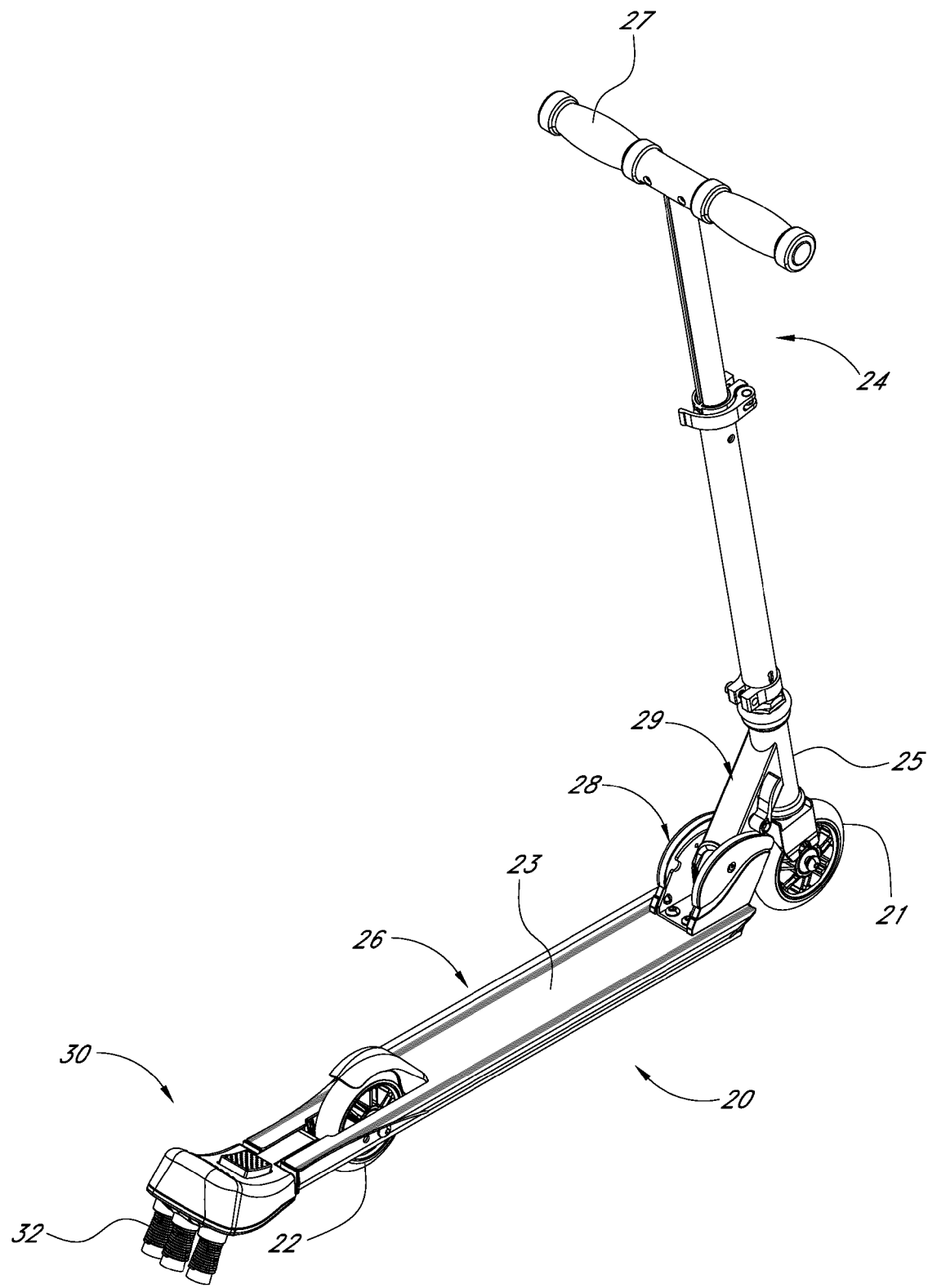
FIG. 1 is a perspective view of one embodiment of a scooter and marking device.

FIG. 1 illustrates a marking device supported by a personal mobility vehicle and, in particular, a scooter and having certain features, aspects and advantages of the present invention. The scooter includes a scooter body 20, which includes a deck 26 and a handlebar assembly 24. Preferably, the upper surface of the deck 26 includes a foot rest surface 23 which is configured to support a foot or the feet of a user. The scooter includes one or more wheels 21, 22 supported by the scooter body 20. The illustrated scooter includes a pair of wheels spaced apart from one another with the deck 26 extending therebetween. Preferably, the wheels 21, 22 are aligned in the same plane, as illustrated, and located at opposite ends of the deck 26. As illustrated, a preferred embodiment of the scooter also includes a head tube 25 which rotatably supports the handlebar assembly 24 so that the handlebar assembly 24 can rotate or swivel within the head tube 25. Preferably, the handlebar 27 height can be adjusted by sliding telescoping portions of the handlebar assembly 24 relative to one another in a direction toward or away from the deck 26. The body includes a support assembly 29 between the head tube 25 and the deck 26. In the illustrated arrangement, the support assembly 29 permits the handlebar assembly 24 to be folded relative to the deck 26. A pivoting mechanism 28 is configured to allow the support assembly 29 and head tube 25 to rotate with respect to the scooter body 20.

In one arrangement, the scooter body 20 supports a marking device 30 configured to create markings on a surface upon which the scooter is ridden. The marking device 30 includes a marking assembly 32 or mechanism that is configured to generate markings on the riding surface in response to frictional contact with the surface. As illustrated, the marking device 30 is supported by a scooter. However, the marking device 30 can be configured to be attached to or supported by any personal mobility vehicle, including scooters, skateboards, bicycles, rollerblades, tricycles, foot powered toys, children's riding toys, etc. The term "personal mobility vehicle" is a broad term, used herein in accordance with its ordinary meaning, and includes a multitude of vehicles having a body to support a user and at least one wheel. Personal mobility vehicles can fully support a user or only partially support a user, and they can have one wheel or multiple wheels and can be powered or unpowered.

In one embodiment, the marking device 30 includes a marking assembly 32 with at least one and preferably several marking members which are elastic. The marking assembly 32 or mechanism has a first portion and a second portion. The first portion is supported by the marking device 30 and scooter body 20. The second portion of the marking assembly 32 contacts the riding surface. Preferably, the second portion of the marking assembly 32 is configured to generate markings or, alternatively, supports a material that is configured to generate markings. The illustrated marking assembly 32 bends in order to maintain contact between the riding surface and the marking assembly 32 or marking material. When in use, the marking assembly 32 bends or deforms about its default longitudinal axis. The elastic marking assembly 32 can be configured to have a certain length such that it is forced to bend about its longitudinal axis when it or the marking material its supports contacts the riding surface. Preferably, the marking assembly 32 comprises a spring that holds a marking material, such as chalk, as is described below. However, in other embodiments, the marking member could include a solid member or comprise material that does not bend.

The marking device 30 can be configured to always be in contact with a riding surface while the scooter (or other vehicle) is in nolinal use. However, in the illustrated arrangement, the marking device 30 is supported by the scooter body 20 and has selectable first and second positions. The marking device includes a marking assembly 32 with at least one marking member which is configured to generate markings when in contact with the riding surface. In the first position, the marking assembly 32 does not contact the riding surface. In the second position, the marking assembly 32 contacts the riding surface. Preferably, the marking device 30 is user actuated so that the user can act upon the marking device in order move it from the first position to the second position or from the second position to the first position. Preferably, the marking device is biased towards one position or the other by a spring or other tensioning or force exerting mechanism. In some embodiments, the marking device 30 can be fixed in the first position and/or it can also be fixed in the second position. The first position and second positions can be non-marking and marking positions, respectively, that correspond generally with the uppermost and lowermost rotational positions of the marking device 30. However, the first and second positions can also be selected intermediate positions between the two outer ends of the range of movement of the marking device 30. In addition, more than two distinct positions are possible. The marking device 30 may be positionable in a plurality of positions, multiple of which may be marking or non-marking, or infinitely adjustable within the range of movement of the marking device 30. Although the illustrated marking device 30 includes an actuation assembly (described further below) that permits the marking device 30 to be moved between selected positions by acting on the actuation assembly, in other arrangements the marking device 30 may be manually adjustable into a desired one of two or more positions. Alternatively, the marking device 30 could be fixed in a single position.

Figure 2:
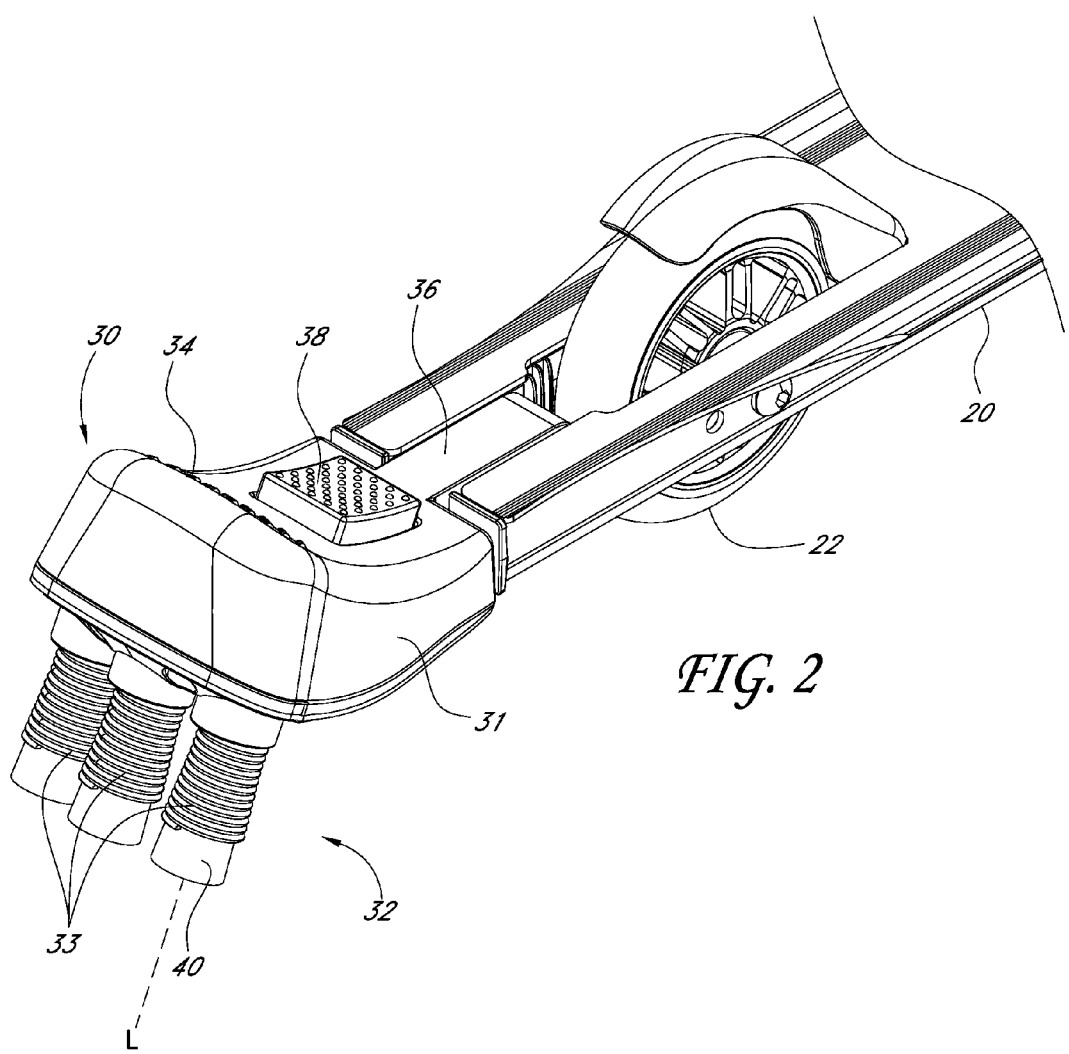
FIG. 2 is a perspective view of the marking device of FIG. 1.

FIG. 2 illustrates the marking device 30 supported by the scooter body 20. As illustrated, the marking device 30 is supported by the scooter body 20 at a location proximate a rear wheel 22. However, an embodiment of the marking device could be supported at various locations and proximate different portions of a scooter. The marking device 30 includes a body 31 which includes an attachment portion 36. Preferably, as shown, the attachment portion 36 and body 31 are rotatable in relation to the scooter body 20. The attachment portion 36 can also be supported in other configurations that allow relative movement between the marking device 30 and the scooter body 20. For example, the attachment portion 36 can also be fixedly supported or supported in a way that allows translational movement with respect to the scooter body 20. In one such arrangement, the marking device 30 can be supported by the scooter body 20 in a manner that allows the entire marking device 30 to move vertically relative to the scooter body 20 by using a slot or track.

The marking device 30 includes a marking portion or assembly 32 supported by the body 31 and configured to generate markings on a riding surface when in frictional contact with the riding surface. Preferably, the marking assembly 32 comprises one or more elastic members or springs 33, each configured to bend about its longitudinal or default axis, labeled L in FIG. 2. As shown, the longitudinal axis L extends lengthwise through the center of the circular cross-section of the spring 33. In the illustrated arrangement, the marking assembly 32 comprises a coiled spring 33 which can bend about its longitudinal axis L in an elastic manner. The illustrated marking device 30 includes three marking assemblies 32.

As illustrated, the marking assembly 32 can comprise linear coil springs 33. Preferably, the coils of each spring 33 are in contact with one another or very close to being in contact with one another in a relaxed state of the spring 33. However, the spring 33 can also be arranged so that there is space between the coils. Preferably, the spring 33 is rigid enough to hold a marking material 40 against the riding surface with sufficient force to create substantial markings on the riding surface. Also, the spring 33 is preferably elastic enough to conform to the riding surface so that markings are generated even on uneven or rough surfaces. The spring 33 also preserves contact between the riding surface and the marking material 40 even as the marking material 40 is consumed and changes length and/or shape. Preferably, one or more characteristics of the spring 33 (e.g., spring constant, wire diameter, length, outer diameter or inner diameter) are selected such that, in use, the spring 33 is rigid enough to hold a marking material 40 against the riding surface with sufficient force to create substantial markings on the riding surface, is elastic enough to conform to the riding surface, and accommodates changes in length and/or shape of the marking material 40 as a result of consumption of the marking material 40. However, other values may be selected or used depending on the desired characteristics of the marking device 30.

The marking assembly 32 also preferably includes a marking material 40 which is configured to generate markings when in frictional contact with the riding surface. Preferably, the marking material 40 is chalk, but it can be any material capable of generating markings on the riding surface. In other embodiments, the marking assembly 32 allows very limited bending or is rigid. In yet other embodiments, the marking assembly 32 comprises only a marking material which is supported by the body 31.

The marking device also includes an actuation portion 34 which is preferably an integrated portion of the body 31. In other embodiments, the actuation portion could be a separate member supported by the body 31 of the marking device 30. The actuation portion 34 is located proximate the foot of a user as the user rides the scooter. Preferably, the actuation portion 34 is configured to be conveniently actuated by the foot of a user by being located proximate the scooter body 20 and the rear wheel 22. The actuation portion 34 is also configured in a shape and size that is easily actuated by the foot of a user. The marking device 30 also includes a button 38 and corresponding locking mechanism and release mechanism.

Figure 3:
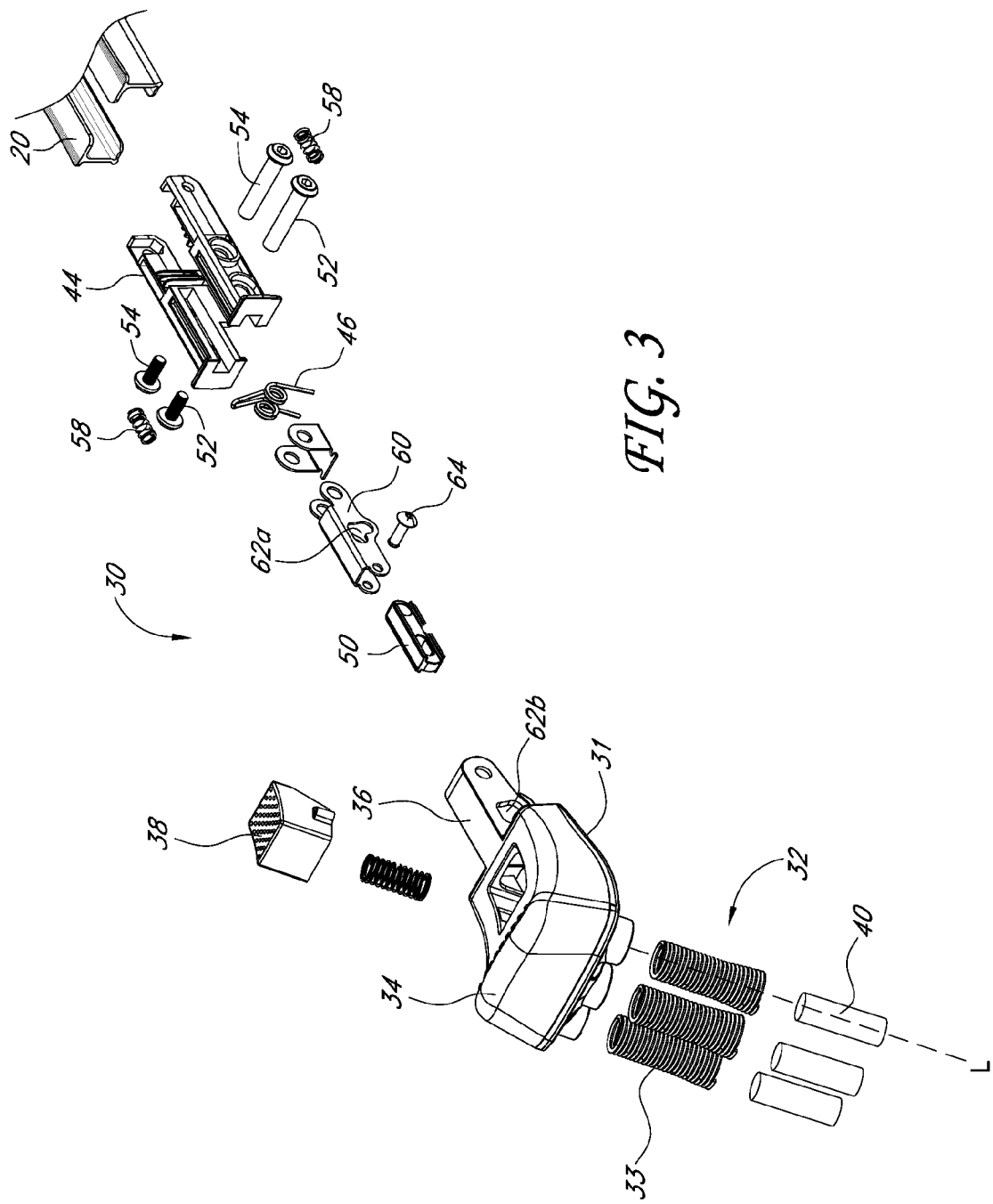
FIG. 3 is a perspective view of the marking device of FIG. 1 with its parts exploded or removed.

FIG. 3 illustrates the marking device of FIG. 2 with certain of its parts and members unassembled. The marking device 30 includes a support or fitting member 44 which is configured to be supported by the scooter body 20. In the illustrated embodiment, the fitting member 44 is fixed with respect to the scooter body 20. Preferably, a portion of the fitting member 44 slides in between flanges of the deck 26 and is supported by and within the scooter body 20. The marking device 30 also includes a rotation or support pin 54. The illustrated pin 54 includes a shaft portion and a screw portion with a threaded engagement therebetween. However, other suitable arrangements may also be used. The support pin 54 is supported by the fitting member 44 and configured to allow the body 31 of the marking device 30 to rotate with respect to the fitting member 44 and scooter body 20. Preferably, the body 31 is supported by the support pin 54 and rotates about the longitudinal axis of the support pin 54. The marking device 30 also includes a biasing member or spring 46 which is supported by the fitting member 44 and configured to apply a force on the body 31 of the marking device 30 so that the body 31 is biased in a rotational direction. Preferably, the biasing spring 46 biases the body 31 towards a position in which marking does not occur. However, in other embodiments, the biasing member could be configured to bias the marking device 30 towards a position in which marking occurs. Also, in some embodiments, the biasing member is not necessarily a spring and instead could be any device or member that applies a pressure or force to bias the marking device 30 in a desired direction.

The marking device 30 includes a locking pin 52 which is supported by the fitting member 44. The locking pin 52 can include a shaft portion and a screw portion with a threaded engagement therebetween, similar to the support pin 54. The locking pin 52 can move in a locking slot 62 toward and away from the support pin 54, but the locking pin 52 is held in substantially the same plane as the support pin 54 by a slot in the fitting member 44 through which the locking pin 52 passes. A guided block 60 is configured with the locking slot 62a, which accommodates the locking pin 52. The guided block 60 is rotatably supported by the support pin 54 and can rotate with respect to the scooter body 20 and fitting member 44. Preferably, the attachment portion 36 of the body 31 also includes a corresponding locking slot 62b. A biasing member or locking spring 58 is configured to bias the locking pin 52 towards a locked position within the locking slot 62 and away from the support pin 54. The locking pin 52 and locking slot 62 can be configured to allow the marking device to be locked in at least one desired position, as described below.

A release member 50 is supported within the guided block 60 by the locking pin 52 and a release member support pin 64. The release member 50 is configured to move horizontally within the guided block 60 and move the locking pin 52 relative to the fitting member 44 to release the locking pin 52 from a locked position in the locking slot 62a, 62b (collectively referred to by the reference number 62). A button 38 is supported by the body 31 and configured to be accessible to a user. Preferably, when a user actuates the button 38, the release member 50 moves horizontally and moves the locking pin 52 from a locked position and to a different position within the locking slot 62. Alternatively, the button 38 can be a lever or other device configured to activate a release by the release member 50.

As described above, the body 31 of the marking device 30 includes an actuation portion 34 and a marking assembly 32 with elastic members or springs 33. As illustrated, the elastic members 33 can be elastic coil springs which are supported by corresponding portions of the body 31. The marking assembly 32 or elastic members 33 can be removably coupled to the body 31, or instead can be built into the body 31 or coupled using a friction fit and/or adhesive. In the illustrated embodiment, marking material 40 is assembled to the elastic members 33 so that at least a portion of the marking material 40 is held within the elastic members 33. Advantageously, with the coil spring elastic members 33, the chalk can be threaded into an interior space of the coil spring and securely held in an efficient and simple manner.

Figure 4A:
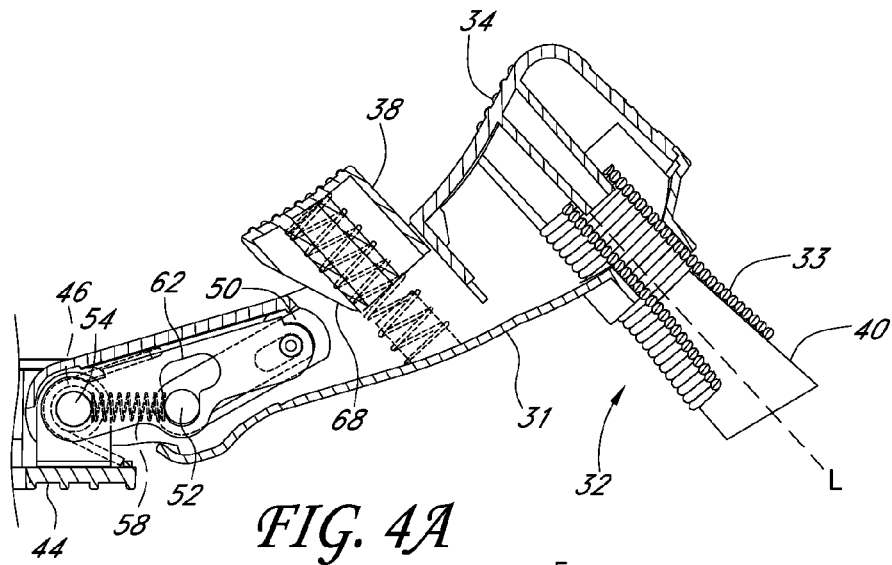
FIGS. 4A-E illustrate the interaction between the members of the marking device of FIG. 1, during engaging and disengaging of the marking mechanism.

FIGS. 4A-4E illustrate the marking device 30 of FIG. 2 and its various members in several relative positions. In FIG. 4A, the marking device 30 is in a position in which the body 31 is rotated upward away from the riding surface so that the marking assembly 32 and marking material 40 do not contact the riding surface. This position is a non-marking position and, preferably, the marking device 30 can remain fixed in this position as the user rides on the scooter and until it is acted upon. When the marking device 30 is in the non-marking position, the biasing spring 46 biases the body 31 upwards so that it remains in this position. The locking pin 52 is in the disengaged position within the locking slot 62. Because the biasing spring 46 biases the body 31 and the locking slot 62 upwards and towards the non-marking position, the locking pin 52 remains in the disengaged position of the locking slot 62.

Figure 4B:
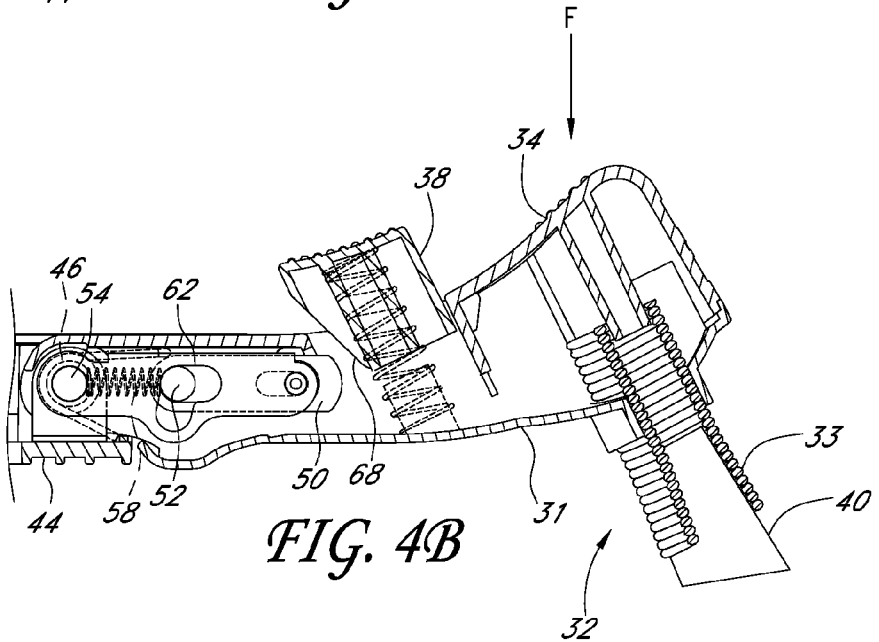

The body 31 is configured to be rotatable with respect to the scooter body 20 and about the axis of the support pin 54. When the actuation portion 34 is acted upon by a downward force (represented by the arrow labeled F), the body 31 rotates downward, as shown in FIG. 4B. As the body 31 rotates downward towards a position in which the marking assembly 32 contacts the riding surface, the locking slot 62 moves downward causing the locking pin 52 to move relatively upward from the disengaged position in the slot 62. The actuation force continues to rotate the body 31 downward until the locking pin 52 reaches the point where the shape of the locking slot 62 permits the locking pin 52 to move forward. At this point, the locking pin 52 can move horizontally within the slot 62, due to the shape of the slot 62. The locking spring 58, which biases the locking pin 52 towards the engaged or locked position, forces the locking pin 52 into the engaged or locked position, as shown in FIG. 4C.

Figure 4C:
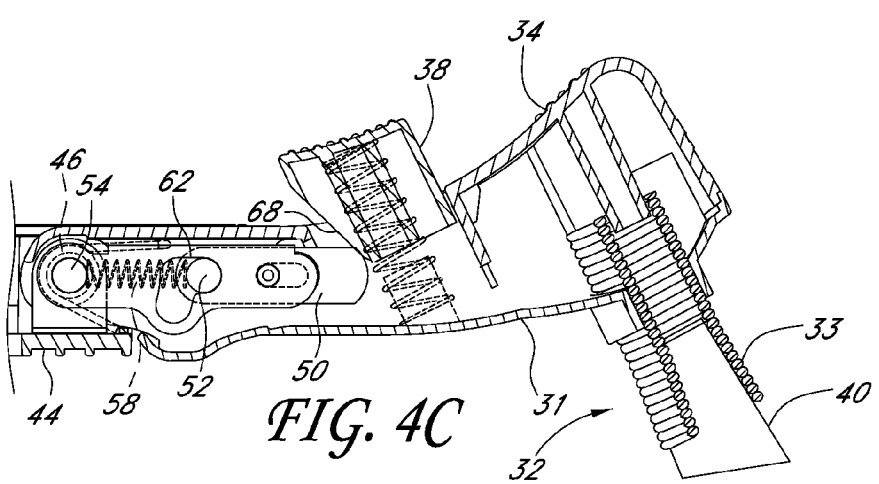
Figure 4D:
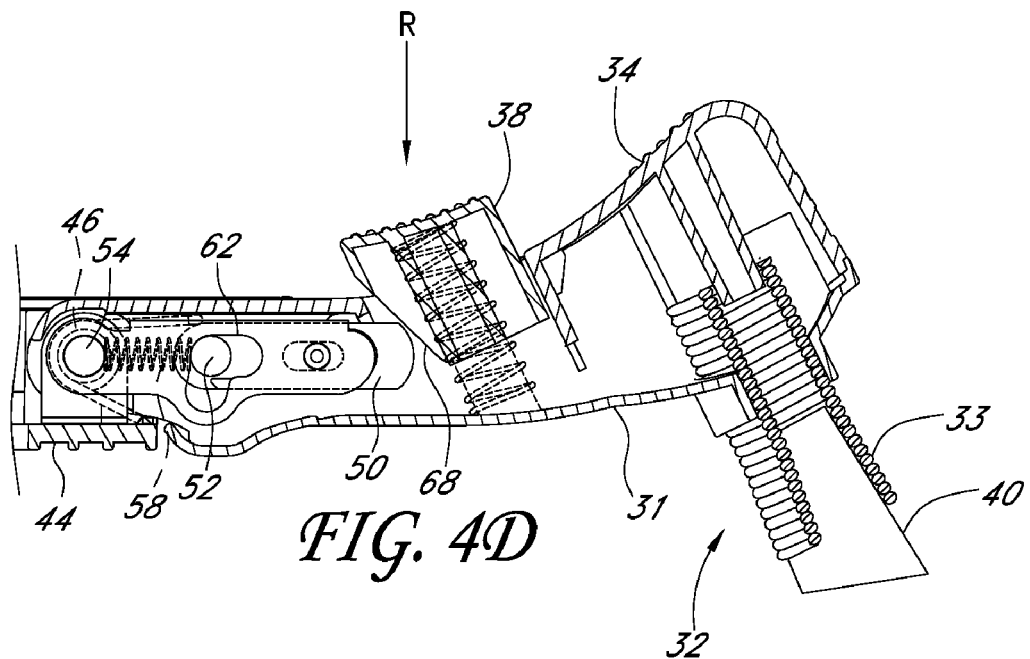
Figure 4E:
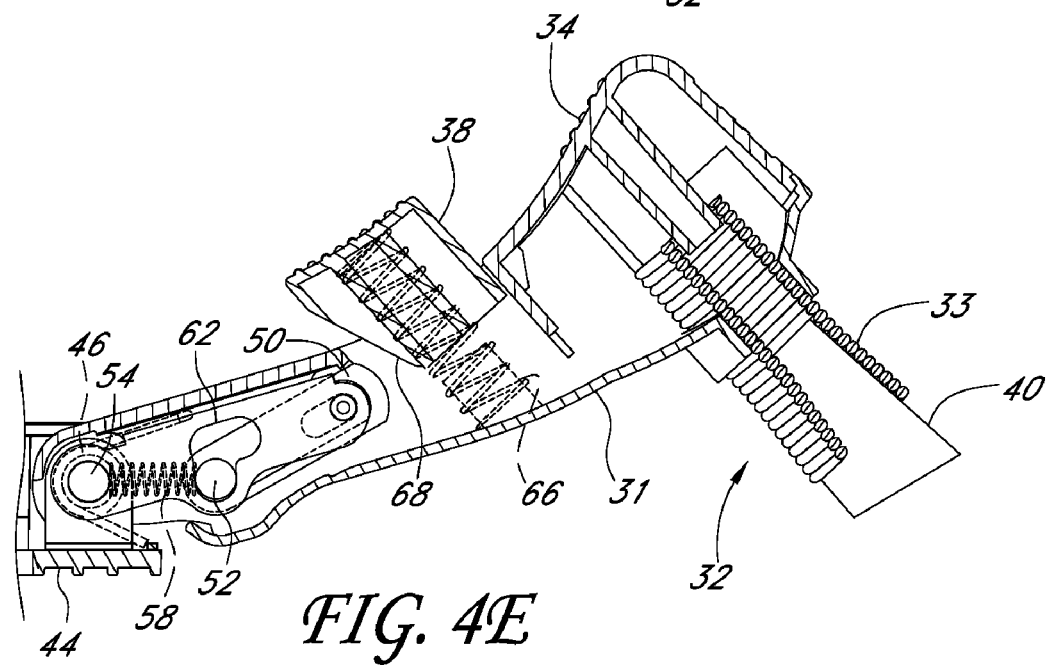

In the locked position shown in FIG. 4C, the marking assembly 32 is in position to cause the marking material 40 to contact the riding surface and generate markings. Preferably, as described above, the marking assembly 32 includes elastic members or springs 33 that are forced to bend when the marking material 40 is placed in contact with the riding surface. The body 31 is fixed in this position and will remain in the marking position until acted upon by the user. In order to release the marking device 30 from this engaged marking position, the user applies a downward force on the button 38. As illustrated in FIG. 4D, the button 38 is configured to release the locking pin 52 from the engaged or locked position within the locking slot 62. The button 38 has a cam surface or sloped surface portion 68 located adjacent the release member 50. As the button 38 is displaced downward, the sloped surface portion 68 contacts the release member 50 to move the release member 50 in the horizontal direction towards the support pin 54. A portion of the release member 50 is configured to move the locking pin 52. As the release member 50 moves horizontally, it causes the locking pin 52 to move horizontally within the slot 62 and out of the engaged or locked position. The force exerted on the locking pin 52 by the release member 50 overcomes the force of the locking spring 58 and the locking pin 52 moves towards the support pin 54. As the button 38 continues to be displaced downward, it causes the release member 50 to be displaced further in the horizontal direction until it pushes the locking pin 52 to a position in which the shape of the slot 62 allows the locking pin 52 to move relatively downward within the slot 62, as shown in FIG. 4D. At this point, the locking pin 52 is released from the locked or engaged position and the body 31 can rotate upward. When the actuation force on the button 38 is released the button returns to its resting position as a result of force from a biasing member, such as spring 66. The rotational force from the biasing spring 46 causes the body 31 to rotate in the upward direction and the locking pin 52 returns to the disengaged position within the slot 62, as shown in FIG. 4E. In this position, the marking device 30 has returned to its disengaged and non-marking position and remains in this position due to the rotational force of the biasing spring 46.

Figure 5:
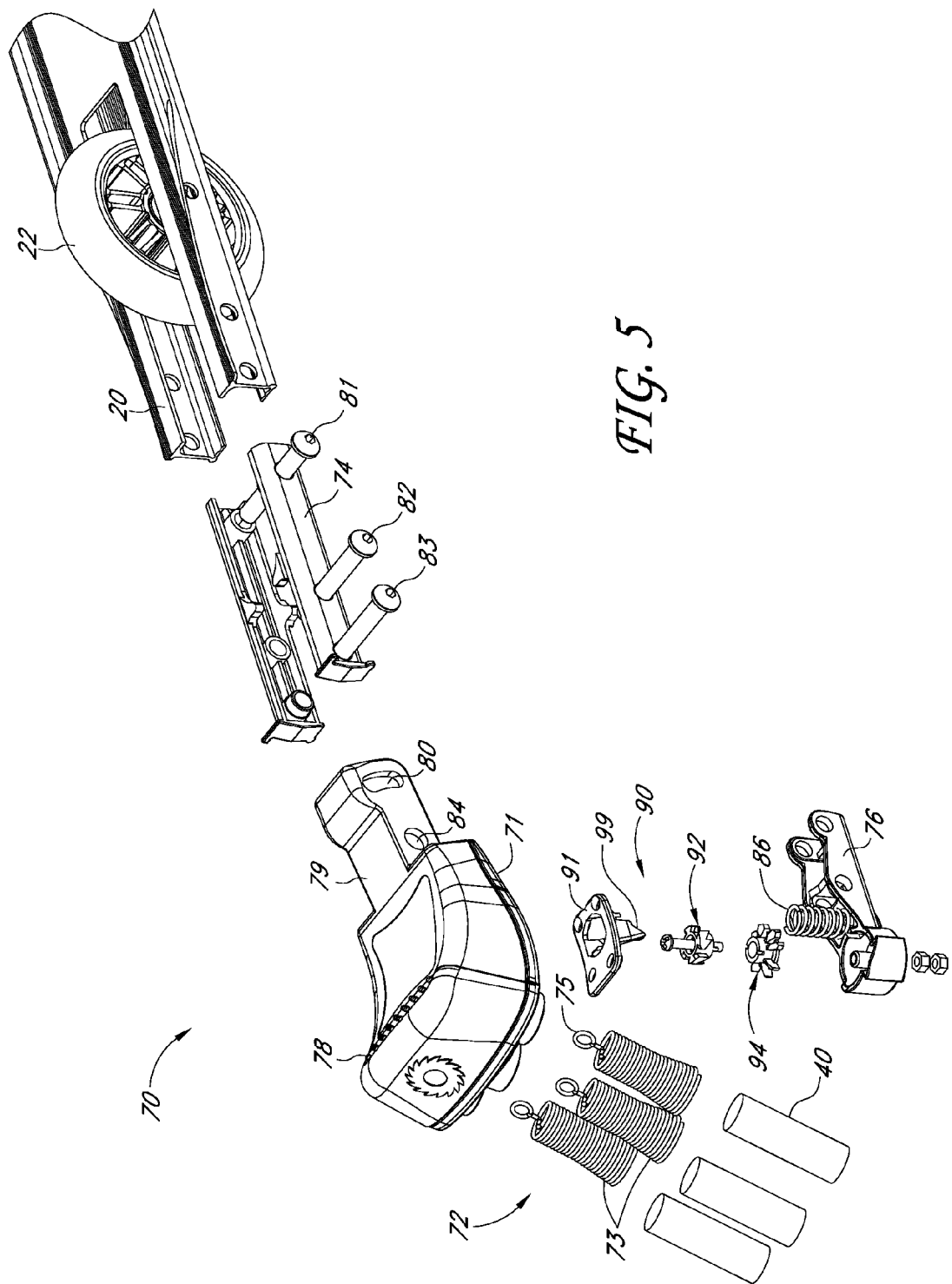
FIG. 5 is a perspective view of an embodiment of a marking device with its parts exploded or removed.

FIG. 5 illustrates another preferred embodiment of a marking device 70 supportable by the scooter body 20. The marking device 70 includes a body portion 71 supported in a manner that allows it to rotate with respect to the scooter body 20. The marking device 70 also includes a marking assembly 72 which is supported by the body portion 71 and has one or more elastic members or springs 73, and a marking material 40. Preferably, each elastic member 73 is configured to bend about its longitudinal or default axis. The longitudinal axis extends lengthwise through the center of the circular cross-section of the elastic member 73. In the illustrated arrangement, each elastic member 73 is a coiled spring a coiled spring which can bend about its longitudinal axis elastically. The illustrated arrangement includes three elastic members 73, but other arrangements could include fewer or more elastic members 73.

Preferably, the elastic members 73 are rigid enough to hold a marking material 40 against the riding surface with sufficient force to create substantial markings on the riding surface. The elastic members 73 are also preferably elastic and conform to the riding surface so that markings can be generated on uneven or rough surfaces. The elastic members 73 can be configured to preserve contact between the riding surface and the marking material 40, even as the marking material 40 is consumed or changes length and/or shape. Preferably, the elastic members 73 are springs that have characteristics (e.g., spring constant, wire diameter, length, outer diameter) the same or similar to those described above in connection with the embodiment of FIG. 1-FIG. 4. Preferably, the elastic members 73 have loops or hooks 75 which can be supported by a portion of the body 71 or marking assembly 72 in order to secure the elastic members in their intended position. In the illustrated arrangement, the loops or hooks 75 are supported by the body portion 71 using members (e.g., bolt, screw, rod or fastener) that extend through the loops 75. The marking material 40 is preferably a chalk stick, but it can be any material capable of generating markings on a riding surface, as discussed in the other embodiments.

The marking device 70 includes an actuation portion 78, which is preferably an integrated portion of the body portion 71. The actuation portion 78 is preferably located near the foot of a user as the user rides the scooter. The actuation portion 78 is conveniently located proximate the scooter body 20 and the rear wheel 22 so that it is easily accessible to the user. Preferably, the actuation portion 78 is also shaped and sized to be easily acted upon by the foot of a user.

A support or fitting member 74 is configured to be supported by the scooter body 20. The support member 74 is fixed with respect to the scooter body 20 and preferably a portion of the support member 74 slides in between flanges of the scooter deck 26 and is supported by and within a portion of the scooter body 20. An axle pin 81 is used to support the rear wheel 22 and extends through a portion of the support member 74 and scooter body 20.

The marking device 70 includes an attachment portion 79 that is preferably an integrated portion of the body portion 71. The attachment portion includes a stop slot 80 and a recess 84. The marking device 70 also includes a base member 76 which supports a biasing member 86. When the marking device 70 is assembled, a support pin 83 extends through a portion of the support member 74 and scooter body 20. The support pin 83 supports the base member 76 and rotatably supports the body portion 71 by extending through the recess 84. A stop pin 82 also extends through a portion of the support member 74 and supports the base member 76. The stop pin 82 also extends through the stop slot 80. Preferably, the body portion 71 can rotate about the longitudinal axis of the support pin 83 and the biasing member 86 is configured to apply a force on the body portion 71 so that the body portion 71 is biased in a rotational direction. Preferably, the biasing member 86 biases the body portion 71 towards a position in which marking does not occur such that the body portion 71 can be selectively fixed in the non-marking position. However, the biasing member 86 can also be configured to bias the marking device towards a position in which marking occurs. The biasing member 86 could be a spring or any device that applies a pressure or force to bias the marking device 30 in a desired direction.

The base member 76 is fixed with respect to the scooter body 20 and support member 74. As the body portion 71 rotates with respect to the scooter body 20 and base member 76, the stop slot 80 moves relative to the stop pin 82. The stop slot 80 and the stop pin 82 can be configured to allow the marking device 70 to be moved to at least one desired position, as described below. The stop slot 80 and stop pin 82 can be configured to interact with one another to prevent the body portion 71 of the marking device 70 from moving beyond its desired positions.

Preferably, the marking device 70 is configured to have at least two positions including a marking position and a non-marking position. Also, the marking device 70 can preferably be or locked in at least one of those positions. The illustrated arrangement includes a locking mechanism 90 configured to allow the user to lock the marking device 70 and body portion 71 in the marking position and also release the marking device 70 from the marking position. The locking mechanism 90 is configured so that when a user applies a downward force on the actuation portion 78 and the body portion 71 moves into the marking position, the locking mechanism 90 fixes or locks the body portion in the marking position. The marking device 70 and body portion 71 remain in the marking position until a user again applies a downward force on the actuation portion 78 causing the locking mechanism 90 to release the body portion 71 so that the body portion 71 returns to a non-marking position.

Preferably, the locking mechanism 90 includes an engagement portion 91 that is supported by the body portion 71 and fixed relative to the body portion 71. The locking mechanism 90 also includes a latching portion 92 and a rotation portion 94 which is supported by the base member 76. Both the latching portion 92 and the rotation portion 94 are supported in a manner that allows them to rotate with respect to the base member 76. Preferably, the latching portion 92 and the rotation portion 94 are coupled so that when one rotates, the other one also rotates the same amount and in the same direction. The latching portion 92 and the rotation portion 94 can be rotatably coupled to the base member 76 using a bolt or screw, as illustrated, or other suitable fastener. Alternately, the latching portion 92 and the rotation portion 94 can be integrated in one piece or member. The locking mechanism 90 is configured so that when the body portion 91 rotates downward, from the non-marking position to the marking position, the engagement portion 91 engages and interacts with the latching portion 92 and the rotation portion 94.

Figure 6:
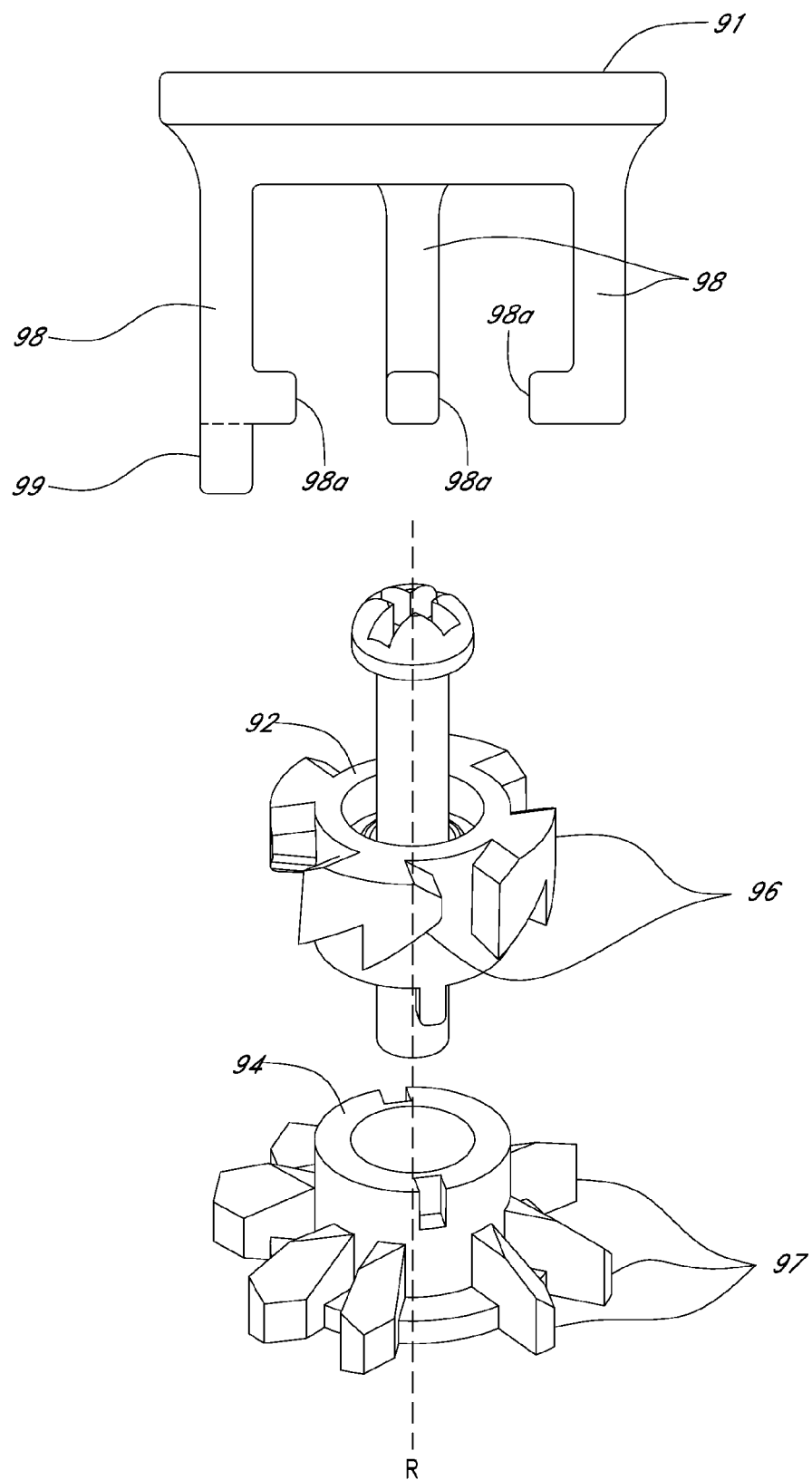
FIG. 6 illustrates the various parts of the locking mechanism of the marking device of FIG. 5.

FIG. 6 illustrates various members of the locking mechanism 90 of FIG. 5. The engagement portion 91 includes multiple engaging members 98. Preferably, the engagement portion 91 includes three engaging members 98 and one of the engaging members 98 is configured with a ramp surface or sloped portion 99. The engaging members 98 extend downward in the direction of the latching portion 92 and rotation portion 94. Preferably, the engaging members 98 have an L-shaped portion 98a, each of which is located at the same vertical depth or in the same horizontal plane and extend radially inward, as illustrated. The sloped portion 99 extends further toward the rotation portion 94 than the L-shaped portions 98a of the engaging members 98. Preferably, the engaging members 98 are located in a circular pattern (in the horizontal plane) and 90 degrees from one another, as illustrated.

In other embodiments, the L-shaped portions 98a can be circular protrusions, sloped portions, hooks, or any other member that protrudes from the engaging members 98. In other embodiments, the engagement portion 91 includes fewer or more than three engagement members.

The latching portion 92 is configured to rotate about the axis R and includes multiple latching members 96. Preferably, the latching members 96 protrude radially outward from the latching portion 92 and axis R so that there are spaces between the latching members 96. The latching portion 92 is configured so that when the engagement portion 91 moves downward and engages the latching portion 92, the L-shaped portions 98a of the engaging members 98 can pass through the spaces between the latching members 96. However, if the latching portion 92 is rotated so that the L-shaped portions 98a are aligned with recessed surface portion of the latching members 96, then the L-shaped portions 98a are prevented from moving vertically past the latching members 96. That is, the bottom surface portion of the latching members 96 is configured to selectively engage the L-shaped portions 98a. The bottom surface portion can also be sloped in a manner that causes the latching portion 92 to rotate when the L-shaped members 98a interact with the latching members 96, as is described below. Preferably, the latching portion 92 includes four latching members 96 which are located at equal angular intervals from one another around the perimeter of the latching portion 92. However, in other arrangements, the latching portion 92 could include fewer or more than four latching members 96.

The rotation portion 94 is configured to rotate about the axis R and is also coupled to the latching portion 92, preferably via a keyed connection, so that the rotation portion 94 and the latching portion 92 rotate together as a unit. The rotation portion 94 includes multiple rotation members 97 which extend radially outward from the axis R. Preferably, each set of two (2) rotation members 97 corresponds with one of the latching members 96, as is described below. Thus, preferably there are four (4) sets of two (2) rotation members 97 per set. The rotation members 97 are sized and shaped to interact with the sloped portion 99 when the body portion 71 approaches or is at or near the marking position. As the engagement portion 91 moves downward, the sloped portion 99 contacts one of the rotation members 97. As the sloped portion 99 moves further downward, interaction between the sloped portion 99 and the ramp surface of one of the rotation members 97 causes the rotation portion 94 to rotate.

The locking mechanism 90 is configured to allow a user to selectively lock the marking device 70 and body portion 71 in the marking position by applying a downward force (and release) on the actuation portion 78 and to selectively unlock the marking device 70 from the marking position by applying a subsequent downward force (and release). When the marking device 70 is in the non-marking position, the body portion 71 is biased upward and away from the riding surface by the biasing member 86. To lock the marking device 70 in the marking position, the user applies a downward force on the actuation portion 78 which causes the body portion 71 to rotate downward toward the marking position. As the body portion 71 rotates downward, the engagement portion 91 moves downward and the L-shaped portions 98a move downward through the spaces between the latching members 96 on the latching portion 92. The engagement portion 91 continues moving downward and the L-shaped portions 98a move to an area vertically lower than the bottom surface of the latching members 96. The sloped portion 99 engages the ramped surface of the clockwise-most rotation member 97 (viewed as oriented in FIG. 6) of a matched pair of rotation members 97 which causes the rotation portion 94 and the latching portion 92 to rotate in a clockwise direction. As the latching portion 92 rotates, the latching members 96 move so that some of the latching members 96 are aligned, at least partially, vertically and above the L-shaped portions 98a. The user releases the force on the actuation portion 78 and the biasing member 86 causes the body portion 71 and engagement portion 91 to move upward. As the engagement portion 91 moves upward, the L-shaped portions 98a engage the bottom of the latching members 96 and the engagement portion 91 and body portion 71 are prevented from moving upward. Preferably, the latching members 96 are configured to lock the L-shaped portions 98a in this position and the marking device 70 is then locked in the marking position. The bottom of the latching members 96 is also preferably sloped so that the latching portion 92 and rotation portion 94 rotate when the L-shaped portions 98a engage the bottom of the latching members 96. Preferably, the bottom of the latching members 96 includes a slot or notch that locks the L-shaped portions 98a in the locked marking position.

The locking mechanism 90 also allows a user to release the marking device 70 and body portion 71 from the marking position by applying a downward force on the actuation portion 78. When the marking device 70 is locked in the marking position, the user applies a downward force on the actuation portion 78 causing the body portion 71 and engagement portion 91 to move downward. The L-shaped portions 98a move downward and away from the bottom of the latching members 96. Preferably, the L-shaped portions 98a move down and out of the slot or notch in the bottom of the latching members 96. The sloped portion 99 engages a rotation member 97 and causes the rotation portion 94 and latching portion 92 to rotate. As the latching portion 92 rotates, the latching members 96 move so that the L-shaped portions 98a are no longer vertically aligned with the latching members 96 in a locking position. Preferably, the latching members 96 are moved so that the L-shaped portions 98a are vertically aligned with a sloped portion of the bottom of the latching members 96, which are configured to contact the L-shaped portions 98a to cause further rotation of the latching portion 92 upon upward movement of the L-shaped portions 98a, as is described in greater detail below.

When the user releases the force on the actuation portion 78, the biasing member 86 causes the body portion 71 and engagement portion 91 to move upward. As described above, as the engagement portion 91 moves upward, the L-shaped portions 98a engage a sloped portion of the bottom of the latching members 96 which is configured to cause the latching portion 92 to rotate when it is engaged. The latching portion 92 rotates so that the L-shaped portions 98a are aligned with the spaces between the latching members 96. The body portion 71 continues to rotate upward as the L-shaped portions 98a moves upward and slides along the sloped bottom portion of the latching members 96 until the L-shaped portions 98a enter into the spaces between the latching members 96. The engaging members 98 move upwards and disengage from the latching members 96, and the body portion 71 returns to the non-marking position away from the riding surface. The marking device 70 remains in the non-marking position until acted upon by the user.

Figure 7:
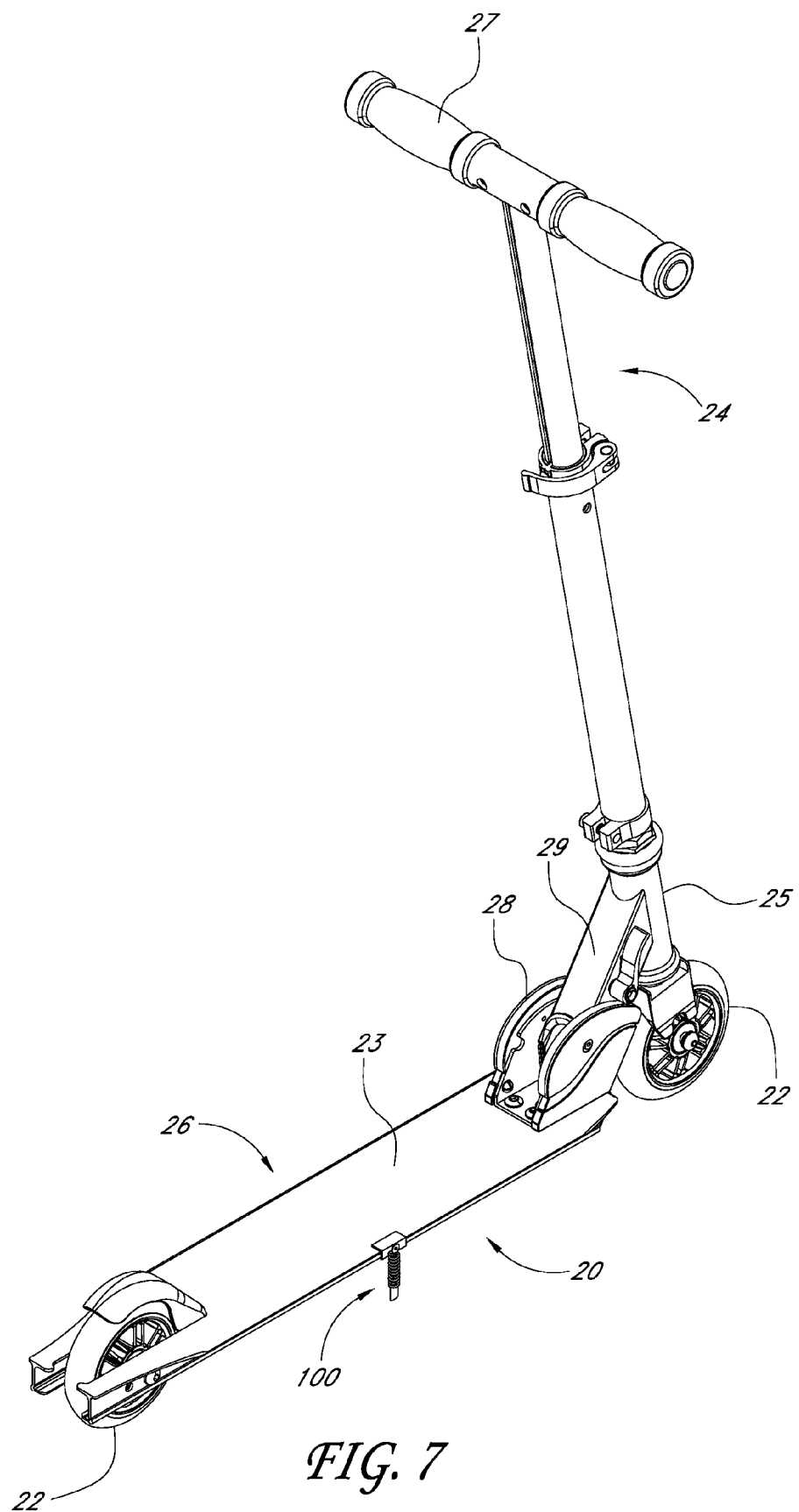
FIG. 7 is a perspective view of another embodiment of a scooter and marking device.

FIG. 7 illustrates an alternate embodiment of a marking device or mechanism 100 supported by the deck 26 of the scooter body 20. The marking device 100 is configured to extend towards the riding surface and contact the riding surface in order to generate markings. In other embodiments, the marking device 100 is supported by portions or members of the scooter or personal mobility vehicle other than the deck 26. In one embodiment, the marking device 100 is supported at the rear of the scooter by the deck 26, rear axle or fender. In another embodiment, the marking device is supported by the head tube 25. In yet another embodiment, the marking device is supported by the handlebar assembly 24. A bracket or clamp(s) can be used to couple the marking device 100 to the head tube 25 or steering assembly 24 or other portion of the scooter. Portions or members of the marking device 100 can be lengthened or shortened depending on where the marking device 100 is supported by or coupled to the scooter and the relative distance to the riding surface. In addition, flexible or rigid support members can be utilized to support the marking device relative to the scooter.

Figure 8:
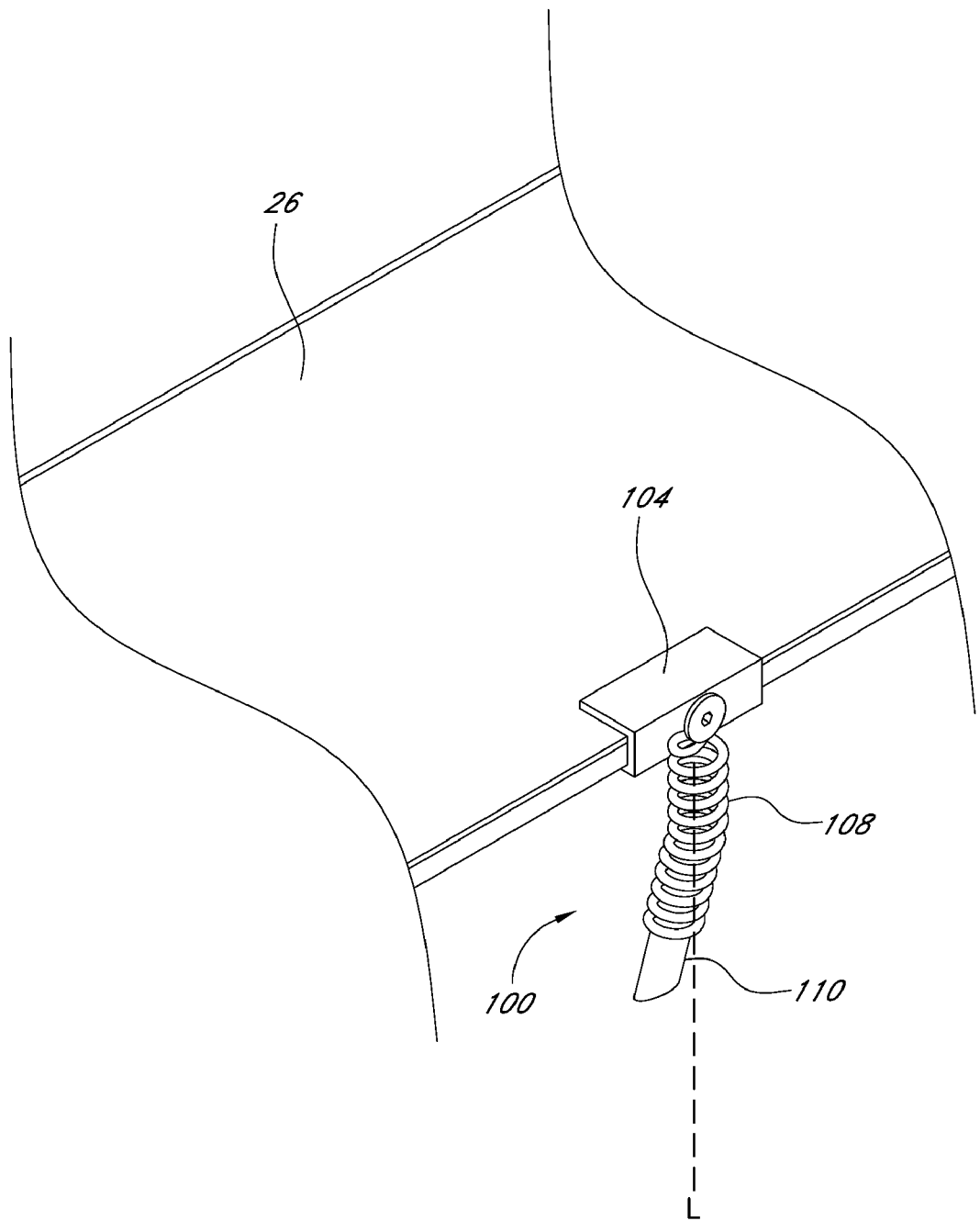
FIG. 8 is a perspective view of a portion of the marking device of FIG. 7.

FIG. 8 illustrates the marking device embodiment of FIG. 7. The marking device 100 includes an attachment member or portion 104 configured to be supported by the deck 26 of a scooter. In some embodiments, the attachment member 104 is coupled to the deck 26 using bolts, screws or an adhesive, for example. The marking device 100 can also be supported using a bracket fastening mechanism, fasteners passing through the running board or by a spring loaded clip mechanism that releasably secures the marking device 100 to the scooter. Other permanent securing mechanisms include adhesives, welding, and brazing, fusing, and making the attachment portion 104 an integral part of the scooter. Preferably, the attachment portion 104 is coupled to the deck 26 in a fixed manner so that the attachment portion does not move (e.g., rotate) with respect to the deck 26.

The marking device 100 includes an elastic member 108 that is supported by the attachment member 104. The marking device also includes a marking material 110 which is supported by the elastic member 108. The elastic member 108 is configured to bias the marking material 110 towards a position in which the marking material 110 contacts the riding surface. The elastic member 108 can comprise any material or configuration that allows bending and has elastic characteristics. As illustrated, the elastic member 108 is or includes a coil spring which is configured to bend or flex about its longitudinal, normal or default axis L. Preferably, the elastic member 108 is configured with a shape and size so that it bends when the marking material 110 is in contact with the riding surface. This configuration assists in preserving contact between the marking material 110 and the riding surface even when the riding surface is uneven or bumpy. It also preserves contact between the riding surface and the marking material 110 even as the marking material wears away and changes length and/or shape. FIG. 8 illustrates how the elastic member 108 can bend in order to maintain contact between the marking material 110 and the riding surface. Preferably, the marking material 110 comprises chalk, but it can comprise crayon, paint, markers, pencil, or any other material that would generate markings on a riding surface. In another embodiment, the elastic member 108 itself comprises a marking material and is configured so that it can generate markings on the riding surface.

As illustrated, the elastic member 108 can have an inner diameter which is sized to retain a portion of a marking material 110. Preferably, the marking material is shaped and sized so that it is larger than the inner diameter of the elastic member 108 and requires force to secure the marking material within the elastic member 108. The marking material 110 can be shaped like a cylinder, or substantially or generally like a cylinder, and secured into the spring elastic member 108 like a screw by twisting the marking material 110 as it is inserted. Where a spring is used for the elastic member 108, the length and resiliency of the spring can be selected to ensure that the correct contact and force is made between the marking material 110 and the riding surface. In some embodiments, multiple elastic members and/or multiple marking materials can be configured on a single marking device in order to generate markings with multiple lines or colors.

In one embodiment, the elastic member 108 is partially or completely replaced by a torsion spring. In such an embodiment, the torsion spring has a first end and a second end. The first end is supported by a portion of the scooter and the second end directly or indirectly supports a marking material. The spring is configured so that its first end is fixed relative to the scooter, and its second end is biased towards a position in which the marking material is in contact with the riding surface. Preferably, the torsion spring provides a rotational force that places the marking material in contact with the riding surface and preserves that contact even if the riding surface is uneven or as the marking material is consumed. Other tensioning mechanisms may be substituted for the spring, including, for example, a torsion spring, dampening mechanism, or telescoping mechanism. In addition, or in the alternative, the attachment portion 104 can be configured to allow the position or orientation (e.g., rotational position) of the marking member and/or elastic member 108 to be adjusted, such as by manual adjustment.

In another embodiment, one or more marking members are supported by a rod or axle. Preferably the marking members are chalk holders that are mounted to the axle or rod. The axle can be supported by the scooter so that its axis is generally parallel to the riding surface when the scooter is in an upright position on the riding surface. A torsion spring is supported by the scooter and provides a rotational force to the axle or rod which biases the marking members towards a position in which they contact the riding surface. In this embodiment, the marking members are biased towards a marking position by the spring, via the axle. In addition, or in the alternative, the rod, axle or other support structure can be configured to allow the position or orientation (e.g., rotational position) of the marking member and/or elastic member 108 to be adjusted, such as by manual adjustment.

Although the invention presented herein has been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular embodiments described above, but should be determined only by a fair reading of the claims that follow.

What is claimed is:

1. A marking device for a personal mobility vehicle, the personal mobility vehicle having a support member and at least one wheel, the marking device comprising:
   a body comprising:
   an attachment portion configured to be supported by the personal mobility vehicle;
   an actuator portion that is accessible to the foot of a user, the actuator portion comprising a release mechanism which is accessible to a foot of the user and is sized and shaped to permit being acted upon by a foot of the user;
   a marking assembly supported by the body and that generates markings when in contact with a riding surface;
   wherein the marking device has an engaged position in which the marking assembly is in contact with the riding surface;
   a locking mechanism configured to hold the marking device in the engaged position;
   wherein the marking device is movable to the engaged position in response to the user acting upon the actuator portion;
   wherein the marking device is releasable from the engaged position in response to the user acting upon the release mechanism of the marking device;
   wherein the release mechanism comprises a button and the locking mechanism comprises a pin and slot configured to lock the marking device in the engaged position.

2. The marking device of claim 1, wherein the marking device is configured to be rotatably supported relative to a personal mobility vehicle.

3. The marking device of claim 2, wherein the marking device is normally biased away from the engaged position.

4. The marking device of claim 1, wherein the marking device is released from the engaged position in response to the user acting upon the actuator portion.

5. The marking device of claim 1, wherein the marking assembly comprises a marking material configured to generate markings when in contact with the riding surface.

6. The marking device of claim 5, wherein the marking assembly comprises an elastic member which bends along its longitudinal axis to bias the marking material toward a position in which it contacts the riding surface.

7. The marking device of claim 5, wherein the marking material is chalk.

8. A marking device for a personal mobility vehicle, the personal mobility vehicle having a body and at least one wheel, the marking device comprising:
   an attachment portion configured to be supported by the personal mobility vehicle;
   a marking assembly that generates markings when in frictional contact with a riding surface, the marking assembly including an actuation member proximate the foot of a user;
   a first position in which the marking assembly does not contact the riding surface;
   a second position in which the marking assembly contacts the riding surface;
   a locking mechanism configured to hold the marking device in the second position;
   wherein the marking device can be moved from the first position to the second position by a user acting upon the actuation portion;
   wherein the marking device can be fixed in the first position and also can be fixed in the second position so that a user can stop acting upon the marking device and the marking device will remain fixed in either the first position or the second position.

9. The marking device of claim 8, wherein at least a portion of the marking device is rotatably supported relative to a personal mobility vehicle.

10. The marking device of claim 8, wherein the marking assembly comprises a marking material and an elastic portion, wherein the elastic portion bends along its longitudinal axis, thus biasing the marking material towards contact with the riding surface.

11. The marking device of claim 10, wherein the marking material is chalk.

12. The marking device of claim 8, wherein the marking device is normally biased towards the first position and away from the second position.

13. The marking device of claim 8, wherein the marking device is released from the second position in response to the user acting upon the actuator portion.

14. The marking device of claim 8, wherein the actuation portion further comprises a release mechanism which is accessible to a foot of the user and is sized and shaped to permit being acted upon by a foot of the user.

15. The marking device of claim 14, wherein the release mechanism comprises a button and the locking mechanism comprises a pin and slot configured to lock the marking device in the engaged position.

16. A personal mobility vehicle, comprising:
a body configured to support a user;
at least one wheel supported by the body and rotatable around an axis;
a marking mechanism supported by the body, the marking mechanism comprising:
  an attachment member configured to be supported by the body;
  an elastic member having a first portion and a second portion, the first portion being supported by the attachment member;
  a marking material configured to generate markings when in frictional contact with a riding surface;
wherein the second portion of the elastic member is configured to support the marking material and bias the marking material towards a position in which the marking material contacts the riding surface;
wherein the second portion of the elastic member and the marking material can move relative to the attachment member and the first portion of the elastic member, and wherein the movement of the marking material is constrained only by the elastic member;
wherein the elastic member is configured to bend in order to assist in maintaining contact between the marking material and the riding surface.

17. The personal mobility vehicle of claim 16, wherein the marking mechanism is rotatably supported by the body of the personal mobility vehicle.

18. The personal mobility vehicle of claim 17, wherein the marking mechanism is biased toward a position in which the marking material contacts the riding surface.

19. The personal mobility vehicle of claim 16, wherein the elastic member is a spring configured to bend about its longitudinal axis.

20. The personal mobility vehicle of claim 16, wherein the marking material is chalk.

21. The personal mobility vehicle of claim 16, wherein the marking material moves in any radial direction relative to the first portion of the elastic member.

22. The personal mobility vehicle of claim 16, wherein the elastic member is a coil spring, the coils defining a longitudinal axis extending lengthwise through the center of the circular cross-section of the spring when the spring is in a relaxed condition, the spring being configured to bend so that the longitudinal axis curves when the marking material is in frictional contact with a riding surface.

* * * * *